United States Patent [19]
Park

[11] Patent Number: 5,786,802
[45] Date of Patent: Jul. 28, 1998

[54] CIRCUIT AND METHOD FOR VERTICALLY EXPANDING A DISPLAY IMAGE

[75] Inventor: Se-Woong Park, Seoul, Rep. of Korea

[73] Assignee: Samsung Electronics Co., Ltd., Kyungki-Do, Rep. of Korea

[21] Appl. No.: 579,673

[22] Filed: Dec. 28, 1995

[30] Foreign Application Priority Data

Dec. 28, 1994 [KR] Rep. of Korea ............ 1994-38080

[51] Int. Cl.⁶ .................................................. G09G 5/00
[52] U.S. Cl. .................................. 345/127; 348/443
[58] Field of Search ............................. 345/127, 130, 345/131, 132; 348/443, 445, 448, 454, 458

[56] References Cited

U.S. PATENT DOCUMENTS

| | | | |
|---|---|---|---|
| 5,119,082 | 6/1992 | Lumelsky et al. | 345/132 |
| 5,218,436 | 6/1993 | Sugiyama et al. | 348/445 |
| 5,223,928 | 6/1993 | Hamada | 348/445 |
| 5,450,129 | 9/1995 | Matoba et al. | 348/445 |
| 5,488,389 | 1/1996 | Nakanishi et al. | 345/131 |

*Primary Examiner*—Steven J. Saras
*Assistant Examiner*—Xu-Ming Wu
*Attorney, Agent, or Firm*—Sughrue, Mion, Zinn, Macpeak & Seas, PLLC

[57] ABSTRACT

A circuit and method for vertically expanding a display image in an image processing apparatus. The circuit includes a section for generating a signal for classifying a field of a color signal as an even field or an odd field; a multiplexer for multiplying lines of data output from a first memory and a second line memory by coefficients according to the signal for classifying the field as being an even field or an odd field; and a line of data output section for outputting a new line of data by adding the two lines of data corresponding to the lines of data output from a first memory and a second line memory.

1 Claim, 3 Drawing Sheets

5,786,802

CIRCUIT AND METHOD FOR VERTICALLY EXPANDING A DISPLAY IMAGE

BACKGROUND OF THE INVENTION

1. Field of the Invention

The present invention relates to a circuit and method for vertically expanding a display image in an image processing apparatus. More particularly, the present invention relates to a circuit and method for vertically expanding 2 lines of the display image of a color signal into 3 such lines, by using digital filters which have coefficients that differ according to whether the 2 lines of the color signal display image correspond to an even or odd interlaced scanning field of the display image, and for fully displaying the expanded signal lines onto the screen of the image processing apparatus in a vertical direction without degradation of resolution.

The present application for a circuit and method for vertically expanding a display image, is based on Korean Application No. 38080/1994 which is incorporated herein by reference for all purposes.

2. Description of the Related Art

In most cases up until now, conversion of an aspect ratio of a display image is accomplished by a letter box source which vertically expands 3 lines of a color signal display image into 4 such lines. A letter box source is a video source which generates a display signal having a letter box format in which the displayed image is insufficient to display on top and bottom portions of a display area. However, in spite of performing such a 3:4 vertical expansion, since a letter box source does not display the image over the entire display area, problems may be caused in that the display image becomes instable and the resolution quality is degraded.

SUMMARY OF THE INVENTION

It is an object of the invention to provide a circuit and method for vertically expanding a display image by a ratio of 2:3.

It is another object of the invention to provide a circuit and method for vertically expanding a display image so that a letter box source can fully display the display image.

It is yet another object of the invention to provide a circuit and method for vertically expanding a display image without degrading the resolution of the image.

In order to achieve these objects, there is provided a circuit for vertically expanding a display image in which a field memory stores a color signal, a first line memory operates in synchronization with a write enable signal active simultaneously with a read enable signal of the field memory and stores data output from the field memory in units of a line, and a second line memory operates in synchronization with the write enable signal active simultaneously with the read enable signal of the field memory and stores data output from the first line memory, the circuit comprising:

means for generating a signal for classifying a field of the color signal as being one of an even field and an odd field;

means for multiplying line data output from the first line memory by a first coefficient and multiplying line data output from the second line memory by a second coefficient, wherein said first and second coefficients are based on said signal for classifying a field as being one of an even and odd field; and means for outputting a new line data by adding said line data output from the first line memory and the second line memory, respectively multiplied by said first and second coefficients.

Also, there is provided a method for vertically expanding a display image by a ratio of 2:3 in which a field memory stores a color signal, a first line memory, which operates in synchronization with a write enable signal active simultaneously with a read enable signal of the field memory, stores data output from the field memory in units of a line, and a second line memory, which operates in synchronization with the write enable signal active simultaneously with the read enable signal of the field memory, stores data output from the first line memory, the method comprising the steps of:

designating a field of the color signal as one of an even field and an odd field;

multiplying line data output from the first line memory and the second line memory by a first and second coefficient respectively according to the result of said designating step; and outputting a new line of data by adding said line data output from the first line memory and said line data output from the second line memory, each multiplied in said multiplying step.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENT

Figure 1:
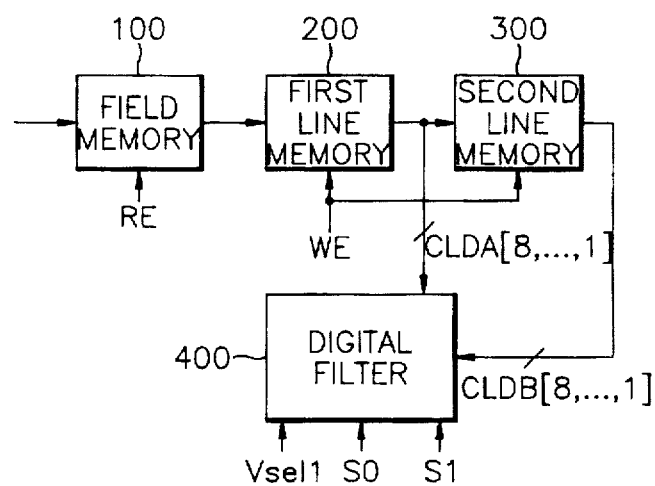
FIG. 1 is a block diagram of a circuit for vertically expanding a display image according to the present invention.

In drawings, the same reference numerals indicate the same components throughout the drawings. Further, in the following description specific details, such as identification of particular elements employed in the circuit and particular filter coefficients, are set forth to provide a more thorough understanding of the present invention. It will be apparent, however, to one of ordinary skill in the art that the present invention may be practiced without employing these specific details. In other instances, well known features have not been described in detail so as not to obscure the present invention.

FIG. 1 is a block diagram of a circuit for vertically expanding a display image according to the present invention. Shown in FIG. 1 is a field memory 100, a first line memory 200, a second line memory 300, and a digital filter 400. Waveforms of the control signals for field memory 100, first line memory 200 and second line memory 300 are shown in FIGS. 3A to 3K. More particularly, field memory 100 is controlled by a read enable signal RE, and first line memory 200 and second line memory 300 are each controlled by a write enable signal WE, so that appropriate data CLDA[8, . . . , 1] and CLDB[8, . . . , 1] are input to digital filter 400.

Figure 3:
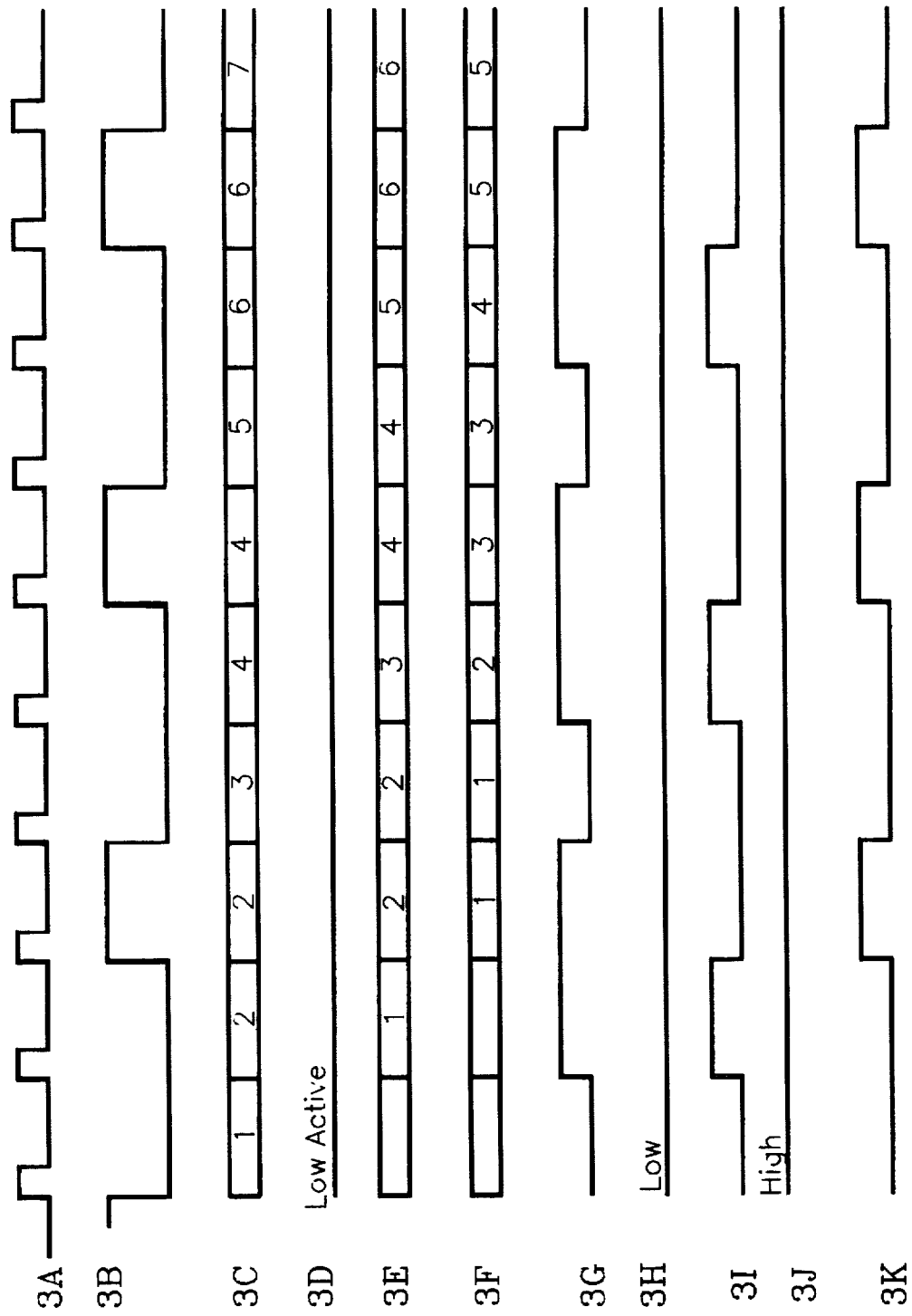
FIGS. 3A to 3K are waveform views illustrating operation of the present invention.

A detailed explanation of the operation of the circuit shown in FIG. 1 is provided with reference to FIGS. 3A to 3K, wherein FIG. 3A shows a clock signal. In the circuit of FIG. 1, a color signal, obtained by multiplying the R-Y and B-Y components, is input to field memory 100 shown in FIG. 1. If the read enable signal RE of field memory 100, as shown in FIG. 3B, is in an active state (e.g., a high state), data corresponding to the preceding line of the color signal is output, as shown in FIG. 3C.

First line memory 200 inputs the signal output from field memory 100. In response to the write enable signal WE, shown in FIG. 3D, which is active simultaneously with the read enable signal RE of field memory 100, first line memory 200 outputs the data stored therein, as shown in FIG. 3E. However, as shown in FIG. 3B, if a falling edge of the read enable RE signal is detected when the write enable signal WE is in an active state (e.g., the low state), first line memory 100 outputs data corresponding to the preceding state without outputting the originally input data, as shown in FIG. 3E.

Second line memory 300 inputs the signal output from first line memory 200, and operation of second line memory 300 is performed in a manner similar to that of first line memory 200 discussed above. FIG. 3F shows the corresponding output of second line memory 300.

Figure 4:
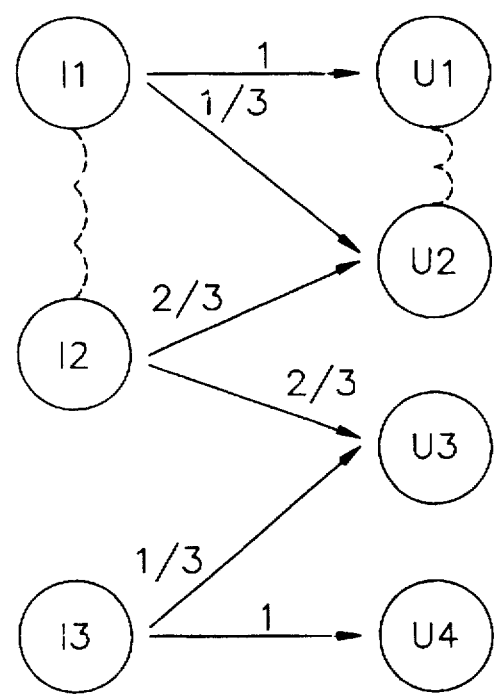
FIG. 4 is a schematic view representing a 2:3 vertical expansion operation according to the present invention.

FIG. 4 is a schematic view showing a 2:3 vertical expansion operation according to the present invention. In FIG. 4, reference numerals I1 to I3 indicate each line of data input to digital filter 400. The other reference numerals U1 to U4 indicate each line of data output from digital filter 400. The vertical expansion of the display image is accomplished by generating three lines of data U1 to U3 from the two lines of data I1 and I2. Assuming that the two lines of data I1 and I2 are displayed on a screen and an interval therebetween is 3 units (which is indicated by a dotted line), the interval between the resulting three lines of data U1 to U3 is 2 units. Accordingly, the 2:3 vertical expansion of the display image is achieved.

The line of data U1 generated by the expansion is identical to the input line of data I1. The other line of data U2 is determined based on a correlation between the input lines of data I1 and I2. Further, since the line of data U2 is located a distance which is farther from the line of data I1 in comparison with the line of data I2, correlation between line of data U2 and line of data I2 is closer so that a higher weight should be provided to line of data I2 when performing the correlation. Thus, in this embodiment of the present invention, a coefficient corresponding to line of data I1 is assigned a value of ⅓ and a coefficient corresponding to the other line of data I2 is assigned a value of ⅔, wherein the sum of the two coefficients is 1.

Meanwhile, all of the even and odd fields are explained by reference to FIG. 4 without further describing them. However, the coefficient value for each line should be different because the lines are in fact different from one another. For the even and odd fields the states of the first to third select signals S0, S1, and Vsel1 are shown in FIGS. 3G to 3K, wherein FIGS. 3G and 3I represent control signal S0 for the odd and even fields, respectively; FIGS. 3I and 3J represent control signal S1 for the odd and even fields, respectively; and FIG. 3K represents control signal Vsel1. The coefficient values are as follows.

| Field number | Vsel1 | CLDB + CLDA | S0 | S1 |
|---|---|---|---|---|
| Odd Number | 0 | X  1 | 0 | 0 |
| Odd Number | 0 | ⅛ + ⅞ | 0 | 1 |
| Odd Number | 1 | ⅝ + ⅜ | 0 | 1 |
| Even Number | 0 | ⅛ + ⅞ | 1 | 0 |
| Even Number | 0 | ½ + ½ | 1 | 1 |
| Even Number | 1 | ⅞ + ⅛ | 1 | 0 |

Figure 2:
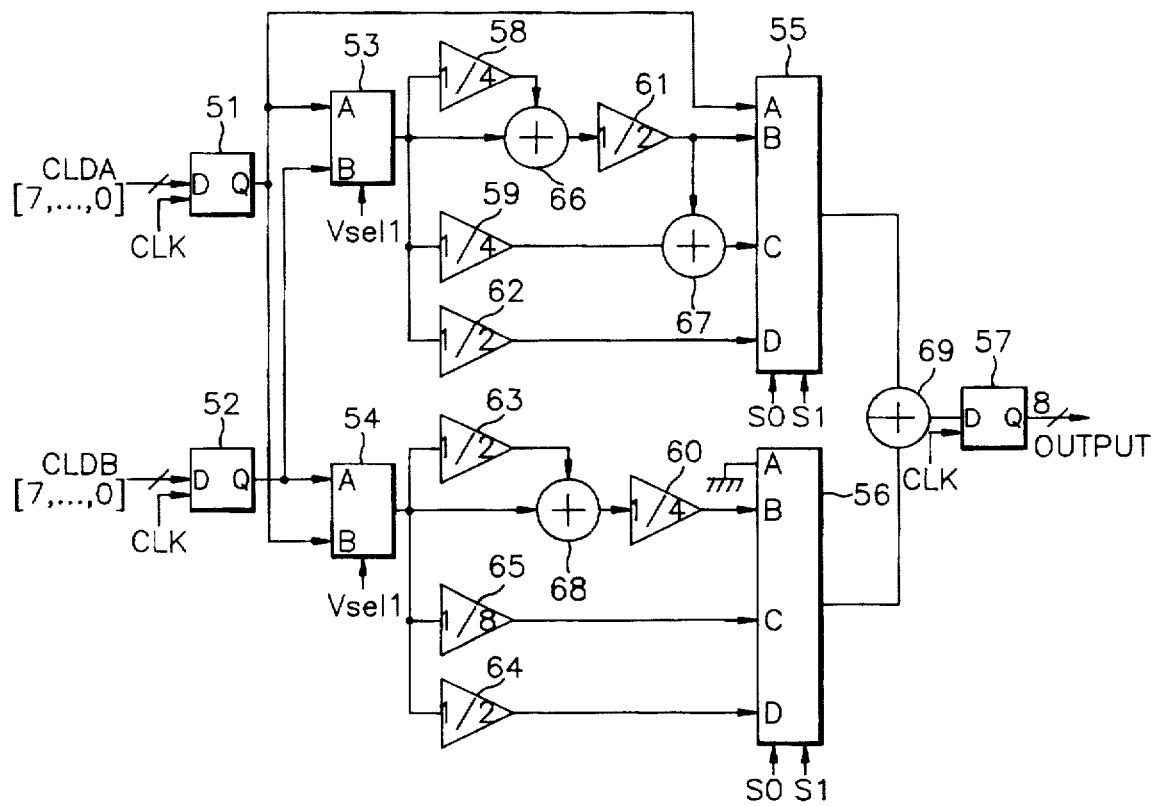
FIG. 2 is a detailed circuit view of a digital filter of FIG. 1.

Digital filter 400, which is formed according to the above table, is shown in detail in FIG. 2. Digital filter 400 comprises first to fourth multiplexers 53, 54, 55, and 56, first to fourth adders 66, 67, 68, and 69, and a Dflip-flop 57. The first and second multiplexers 53 and 54 selectively generate outputs CLDA[7, . . . , 0] of first line memory 200 and the outputs CLDB[7, . . . , 0] of second line memory 300, based on the third select signal Vsel1. First adder 66 adds the output signal from first multiplexer 53 to that same signal amplified by ¼ times that of the output signal. Second adder 67 adds the signal output from first adder 66 amplified ½ times to the output signal of first multiplexer 53 amplified ¼ times. Third multiplexer 55 inputs the signal output from first multiplexer 53 amplified ½ times, and selectively outputs it based on the first select signal S0 or the second select signal S1. Third adder 68 adds the signal output from second multiplexer 54 amplified ½ times, to signal output from second multpliexer 54. Fourth multiplexer 56 inputs signals output from second multiplexer 54 amplified ½ times and ⅛ times, and also inputs the signal output from signal of third adder 68 amplified ¼ times, and selectively outputs them based on first select signal S0 or second select signal S1. Fourth adder 69 adds the output signals of third and fourth multiplexers 55 and 56. Dflip-flop 57 latches the output signal of fourth adder 69.

In controlling multiplexers 55 and 56 with first and second select signals S0 and S1, there should be a determination of which one of the even and odd fields corresponds to which select signal. Further, based on the determination of the field, an appropriate coefficient value can be selected by either of first and second signals S0 and S1.

As discussed above, the present invention provides efficiency in stabilizing the display image.

Although only the preferred embodiment of the present invention is described therein, various modifications can be implemented within the spirit and the scope of the present invention. In particular, in the embodiment of the present invention, although a filter having a specific coefficient value is described therein, it is possible to apply the embodiment thereof to a similar field under the same method. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for vertically expanding a display image in which a field memory stores a color signal, having even and odd numbered fields, wherein the color signal is obtained by multiplying R-Y and B-Y components, a first line memory operates in synchronization with a write enable signal active simultaneously with a read enable signal for controlling the field memory and stores data output from the field memory in units of a line, and a second line memory operates in synchronization with the write enable signal active simultaneously with the read enable signal for controlling the field memory and stores data output from the first line memory, the circuit comprising:

- first and second multiplexers, receiving the line data stored in the first and second line memories, for selectively outputting, according to a third select signal, said line data received from the first line memory and the second line memory;
- a first adder for adding said line data output from said first multiplexer amplified ¼ times to said line data output from said first multiplexer;
- a second adder for adding a signal output from said first adder amplified ½ times to the signal output from said first multiplexer amplified by ¼ times;
- a third multiplexer, inputting the signal output from said first multiplexer amplified by ½ times, for selectively outputting the input signal to said third multiplexer based on a signal for classifying the field as one of the even field and the odd field;
- a third adder for adding the signal output from said second multiplexer amplified by ½ times to said signal output from said second multiplexer;
- a fourth multiplexer, inputting the signal output from said second multiplexer amplified ½ times, the signal output from said second multiplexer amplified ⅛ times and the output of said third adder amplified ¼ times, for selectively outputting said signals input to said fourth multiplexer based on said signal for classifying the field as one of the even field and the odd field; and
- a fourth adder for adding output signals of said third and fourth multiplexers.

\* \* \* \* \*